Dec. 29, 1925.　　　　　　　　　　　　　　　　1,567,534
A. H. MAUDE
METHOD OF AND DEVICE FOR DETECTING OXYGEN
Filed Jan. 2, 1924
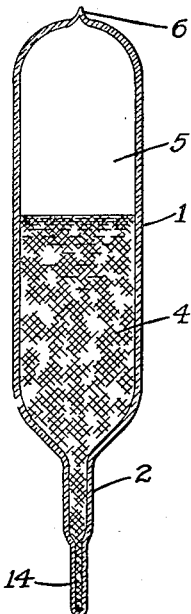
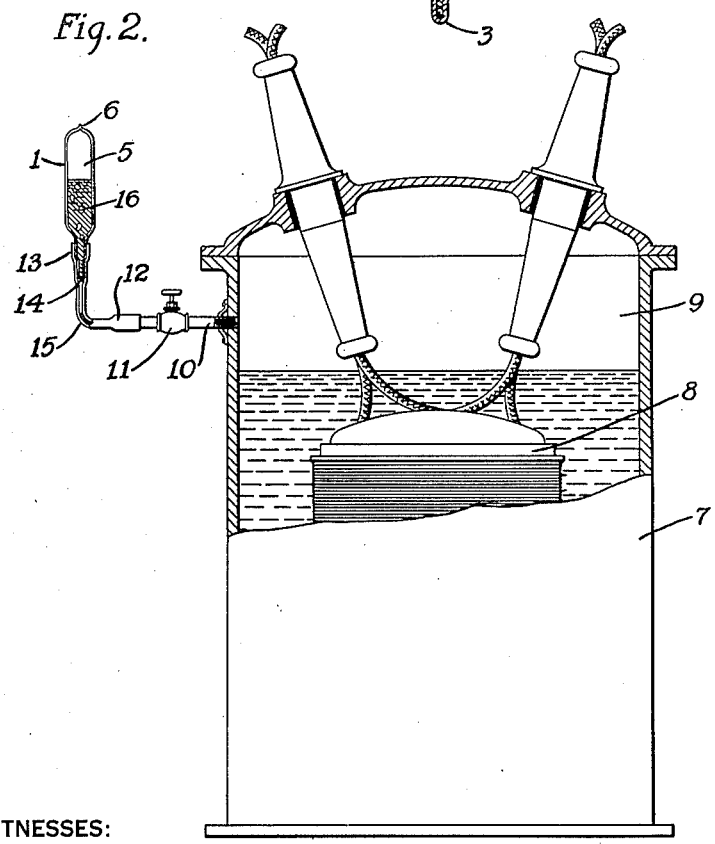
WITNESSES:
INVENTOR
Aylmer H. Maude
BY
ATTORNEY Patented Dec. 29, 1925.

1,567,534

UNITED STATES PATENT OFFICE.

AYLMER H. MAUDE, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF AND DEVICE FOR DETECTING OXYGEN.

Application filed January 2, 1924. Serial No. 684,094.

*To all whom it may concern:*

Be it known that I, AYLMER H. MAUDE, a subject of the King of Great Britain, and a resident of Wilkinsburg, in the county of Allegheny and State of Pennsylvania, have invented a new and useful Improvement in Methods of and Devices for Detecting Oxygen, of which the following is a specification.

This invention relates to the qualitative and quantitative determination of gases, more particularly to the estimation of a constituent of a mixture of gases, such as oxygen in air.

It is an object of my invention to provide a method of, and a device for, detecting gases, which shall be simple in construction, easy to manipulate, and which shall not require any special apparatus or particularly skilled workmen.

In practising my invention, I provide a reagent, which is capable of changing its color by a reaction with the gas to be determined. My device may consist of a sealed glass tube partially filled with a reagent, preferably in solution, the remainder of the space in the glass tube being evacuated. A sample of the gas, of which a constituent is to be determined, is admitted to the glass tube in any suitable manner, and is caused to come in contact with the reagent. The volume of gas which is admitted is equal to the volume of the evacuated space in the tube. The change of color in the reagent is a means for detecting the presence of the constituent to be determined and a quantitative estimation thereof may be had by noting the time necessary to change the color of the solution.

In the accompanying drawing, constituting a part hereof and in which like reference characters indicate like parts, Figure 1 is a vertical cross-sectional view in substantially full scale, of a device for practising my invention, and Figure 2 is a similar view showing the application thereof to the determination of oxygen in the gases in a transformer tank.

I provide a container or tube 1 of glass or any other suitable material, the said tube having a restricted portion 2 and a capillary closed end 3. The liquid 4, which is the reagent for the detection and determination of the gas, is placed in the tube 1 to a predetermined height, leaving a space 5 above the same. The said space is evacuated and is sealed off at point 6.

The solution 4 of reagent may be such as will react with oxygen to produce a visible change, preferably a change in color. A suitable reagent for ranges of oxygen concentration from 1 to 21%, is obtained by reducing indigo carmine with an alkaline stannite. For instance, I may dissolve 4 parts of crystalline stannous chloride with 9 parts of potassium hydroxide in 300 parts of water, thus obtaining a solution of potassium stannite. Seven cubic centimeters of this solution are mixed with 36 cubic centimeters of a one-fourth percent aqueous solution of indigo carmine, and 150 cubic centimeters of water. This reagent has an orange color.

In Fig. 2, I have shown the container or tube 1 in operative position with transformer casing 7, having an oil immersed transformer body 8 therein and a space 9 above the oil. A pipe 10, having a cut-off cock 11 is tapped into space 9. One end 12 of a rubber tube is secured to the outlet from cock 11 and the other end 13 is slipped over constricted portion 2 of tube 1. To determine the oxygen content of space 9, the cock 11 is opened and the capillary portion 3 of the tube is broken at 14, the broken portion 15 remaining in the rubber tube. Because of the vacuum in space 5, bubbles 16 of gas are drawn through the reagent 4 and the oxygen in the said bubbles reacts therewith. To facilitate the reaction, the tube 1 is shaken. The time of breaking the seal is noted, and the time necessary for a change in color of the reagent from orange to green is a measure of the amount of oxygen in the gas in space 9.

For the determination of smaller percentages of oxygen, I may utilize a reagent comprising an aqueous solution of cuprous ammonium chloride. This reagent is colorless, and upon reaction with small amounts of oxygen, turns blue.

Although I have described my invention setting forth specifically the determination of oxygen in the atmosphere of a transformer tank, my invention is not limited thereto, but is equally adaptable for the determination, either qualitatively or quantitatively, of various other gases. For instance, the presence of carbon monoxide may be detected by utilizing as a reagent a solution of silver nitrate and caustic soda. The determination is carried out in the pressence of light or heat, whereby the colorless solution of reagent darkens, owing to the precipitation of black metallic silver. The presence of hydrogen suphide may be detected by using as a reagent an alkaline solution of sodium nitroferricyanide. The reaction changes the reagent from colorless to a reddish purple. It will be apparent to those skilled in the art that the above are but a few examples of the many reactions to which my invention is adapted.

I claim as my invention:

1. A method of detecting gases which comprises providing a sealed evacuated container having a reagent therein, breaking the seal to allow gases to pass through the reagent and noting the color change therein.

2. A method of detecting gases which comprises providing a sealed evacuated container having a reagent therein, breaking the seal to allow gases to pass through the reagent and noting the time required to produce a color change therein.

3. A method of detecting oxygen in gases which comprises providing a sealed evacuated container having a reagent therein, breaking the seal to allow gases to pass through the reagent and noting the color change therein.

4. A method of detecting gases which comprises providing a sealed evacuated container having a reagent therein, breaking the seal to allow gases to pass through the reagent, shaking the container, and noting the color change therein.

5. A method of detecting oxygen in gases which comprises providing a sealed evacuated container having a reagent therein, breaking the seal to allow gases to pass through the reagent and noting the time required to produce a color change therein.

6. A method of detecting gases which comprises providing a sealed evacuated container having reduced indigo carmine therein, breaking the seal to allow gases to pass through the same, and noting the color change therein.

7. A method of detecting oxygen in gases which comprises providing a sealed evacuated container having reduced indigo carmine therein, breaking the seal to allow gases to pass through the solution, shaking the container and noting the time required to change the color of the solution to green.

8. A device for detecting gases comprising a sealed evacuated container, and a reagent therein, said reagent having the property of reacting with gases and of undergoing change in appearance.

9. A device for detecting gases comprising a sealed evacuated container, and a reagent therein, said container having a capillary portion adapted to be broken to allow gases to enter the same.

10. A device for detecting gases comprising a sealed evacuated container, and a reagent therein, the volumes of the reagent and of the vacuum bearing a definite relation to each other.

11. A device for detecting gases comprising a sealed evacuated container and reduced indigo carmine solution therein.

12. A device for detecting gases comprising a sealed evacuated container and an indigo carmine solution reduced with a stannite therein.

13. A device for detecting gases comprising a sealed evacuated container and an indigo carmine solution reduced with potassium stannite therein.

In testimony whereof, I have hereunto subscribed my name this 17th day of December 1923.

AYLMER H. MAUDE.